No. 821,224. PATENTED MAY 22, 1906.
T. J. CORCORAN.
VEHICLE LAMP.
APPLICATION FILED MAR. 26, 1906.
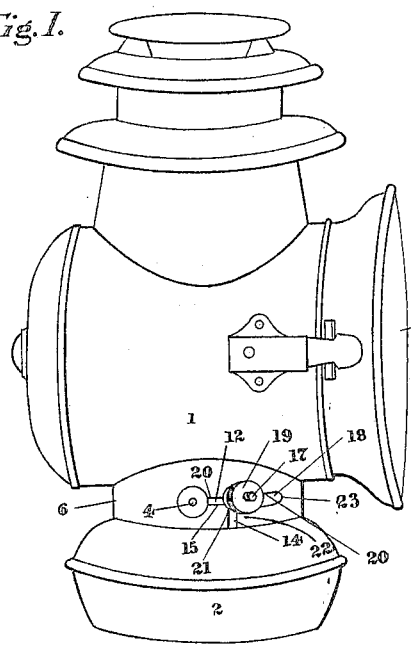
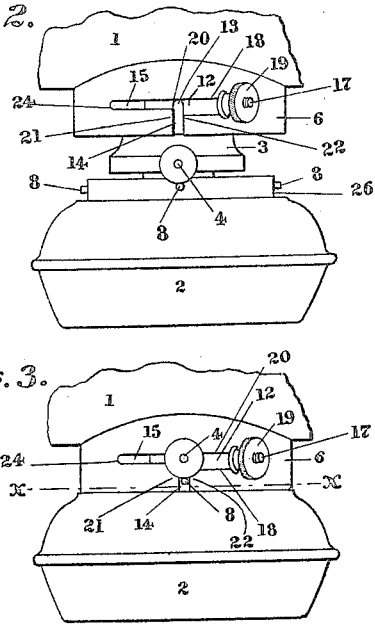
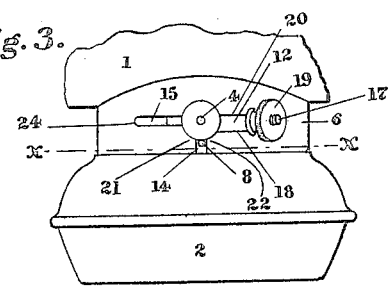
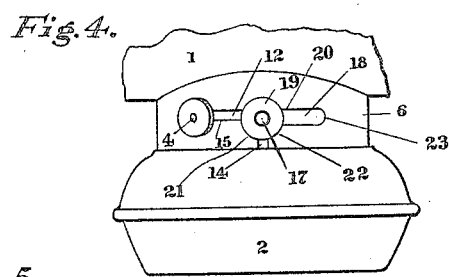
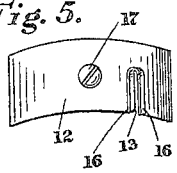
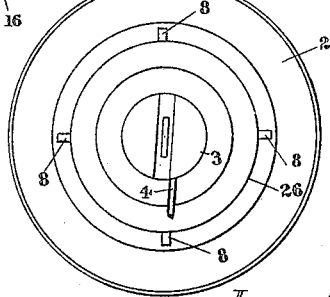
Witnesses.
Harry Henke
Cordelia O'Hearn
Inventor.
Thomas J. Corcoran,
by R. F. Hulsleb,
Attorney.

UNITED STATES PATENT OFFICE.

THOMAS J. CORCORAN, OF CINCINNATI, OHIO.

VEHICLE-LAMP.

No. 821,224.　　　Specification of Letters Patent.　　　Patented May 22, 1906.

Application filed March 26, 1906. Serial No. 308,075.

*To all whom it may concern:*

Be it known that I, THOMAS J. CORCORAN, a citizen of the United States, residing at Cincinnati, in the county of Hamilton and State of Ohio, have invented certain new and useful Improvements in Vehicle - Lamps, of which the following is a specification.

My invention relates to vehicle-lamps, especially such as are used on automobiles or other vehicles, and has for its object the providing of new and improved means for securing the burner-support or pot to the lamp-body, and the invention will be readily understood from the following description and claims and from the drawings, in which—

Figure 1 is a perspective view of my improved device. Fig. 2 is a side elevation of the locking means between the burner-support and lamp-body, the burner-support and lamp-body being broken away and shown in separated relation with the burner entering the lamp-body. Fig. 3 is a side elevation of the same, showing the parts in longitudinally-associated relation, but prior to the turning of the pot or burner-support for locking the parts. Fig. 4 is a side elevation of the same with the parts in locked relation. Fig. 5 is a perspective view of the slot-closing slide. Fig. 6 is a plan view of the pot, showing the locking pins or fingers. Fig. 7 is a perspective view of the locking portion of the body, and Fig. 8 is a bottom-view detail in cross-section on the line $x$ $x$ of Fig. 3.

1 is the body of the lamp, and 2 is a pot or burner-support to which a burner 3 is secured. The burner has a shaft 4, which in the present exemplification of my invention is the wick-shaft of the burner, the pot representing an oil-pot. The body is provided with a locking portion, which is at the lower portion of the lamp-body and is shown as a barrel 6, the inside of which preferably has inclined faces 7, upon which pins 8 on the pot are adapted to ride for drawing the pot toward the body in attaching the former to the latter. The barrel is provided with recesses 9, adapted to permit the insertion of the pins 8 for reception of the latter upon the inclines 7. The inclines are preferably formed upon the edges of inturned flanges 10 of the metal, such as sheet-brass, forming the barrel, thereby forming a channel 11.

12 is a plate provided with a slot 13, adapted to receive the shaft 4 when the pot is secured to the body and also preferably arranged to receive one of the pins 8, the shaft being positioned in substantially vertical plane with one of said pins in securing the burner to the pot. This plate preferably slides in the channel 11. The barrel is provided with a slot 14, registering with the slot 13 when the pot is moved toward the body for bringing the burner inside the body. When the pot is received by the body, the pot is arranged to be turned sidewardly, and for permitting this sideward turning the barrel is provided with a sidewardly-extending slot 15. The plate at the slot is also preferably provided with flanges 16 16, forming side walls for the slot 13 in the plate, adapted to be engaged by the shaft and by the pin in vertical plane therewith for moving the plate sidewardly with the pot in the turning of the pot upon the body. The sideward positioning of this plate, however, is effected preferably primarily by the pin, so as to avoid side stress upon the shaft and avoid the danger of destroying the connection between the burner and pot. The plate is also provided with clamping means clamping the same to the barrel for locking the pot or burner-support in its drawn relation. Thus I have shown a bolt 17 secured to the plate and extending outwardly therefrom in an extension 18 of the slot 15, a thumb-nut 19 taking over the bolt and clamping the plate to the barrel. In such clamped position the inner end of the nut preferably takes against the upper wall 20 of the slots 15 18 and the tongues 21 22, formed between the slot 14 and the slots 15 18, thereby making an especially rigid construction, although it is obvious that such clamping may take place at any point along the sidewardly-extending slots, dependent on the position which the pins 8 occupy on the inclines 7 when the burner-support has been drawn toward the body.

It will be noted that the combined slots 14 15 18 form an associated T-slot in the wall of the barrel, and that the plate 12 serves as a filling-plate for covering these slots when the parts are in locked relation for the exclusion of air-currents from the interior of the lamp, and, further, that the movement of the plate into the unlocked relation of the securing means is limited by the bolt 17 taking against the end wall 23 of slot 18, thereby causing the slots 13 and 14 to register, and that the movement of the plate into locked relation is limited by the shaft 4 taking against the end wall 24 of the slot 15, this shaft being also sidewardly held against movement by the walls of slot 13 for maintaining all the parts in correct relation and insuring that the flame shall always be substantially transverse of the front face 25 of the lamp.

As already stated, the inside of the barrel is formed with flanges 10. These flanges are preferably annular. The pot or burner-support is also preferably provided with an annular wall 26, in which the pins 8 are secured, the said annular wall being hugged by the flanges 10 when the parts are in assembled relation for definitely centering the burner in the lamp.

In vehicle-lamps, especially such as are used on automobiles, where they are subjected to continued and violent vibration and jarring, my improved device is especially serviceable, as the parts are all held in locked relation by positive fastening means, and the parts are so correlated as to make a neat appearance, to prevent detrimental currents reaching the flame, and to secure the parts rigidly together.

Having thus fully described my invention, what I claim as new, and desire to secure by Letters Patent, is—

1. The combination of a lamp-body and a burner-support, the lamp-body and burner-support having mating engaging means, the said engaging means arranged to act upon relative turning between said lamp-body and burner-support, the lower portion of said lamp-body having a transverse slot and a downwardly-extending slot merging therewith, a plate at said slot, said plate having a slot arranged to receive the shaft of the burner of said burner-support, and a clamp extending from said plate through said transverse slot to outside said lamp-body for clamping the parts together after said relative turning between said lamp-body and burner-support.

2. The combination of a lamp-body and a burner-support, the lower portion of said lamp-body having a downwardly-extending slot and laterally-projected slots extending from said first-named slot, a plate taking across said slots and having a slot therein adapted to register with said downwardly-extending slot in a given position between said plate and first-named slot, said burner-support having a part thereon adapted to take through one of said laterally-extending slots, and said plate having clamping means thereon extending through the other of said laterally-extending slots, substantially as described.

3. The combination of a lamp-body and a burner-support, the lower portion of said lamp-body forming a seat for said burner-support, and said burner-support adapted to be received by said seat and turned therein, the lower portion of said lamp-body provided with a T-slot, a plate adapted to take across said T-slot and having a slot adapted to register with the downwardly-extending stem of said T-slot, a screw-clamp on said plate having movement in one of the laterally-extended wings of said T-slot, the other of said laterally-extended wings of said T-slot adapted to receive the shaft of said burner-support, substantially as described.

4. The combination of a lamp-body and a burner-support, the lower portion of said lamp-body formed into a seat having inclined ways, the burner-support provided with pins arranged to travel on said ways, the shaft of the burner of said burner-support arranged to be placed substantially vertically of one of said pins, the lower portion of said lamp-body having a downwardly-extending and downwardly-opening slot arranged to receive said shaft and last-named pin, a plate having a downwardly-extending slot adapted to register with said first-named slot when receiving said shaft and pin, the lower portion of said lamp-body having a sidewardly-extending slot to each side of said first-named slot and merging therewith, a screw-clamp on said plate, said burner-support arranged to turn in said seat and thereby move said plate by contact of said last-named pin with the wall of the slot in said plate and thereby move said burner-shaft into one of the sidewardly-extending slots and the screw-clamp in the other of said sidewardly-extending slots and for drawing said burner-support toward said lamp-body, said screw-clamp arranged to clamp the burner-support to the lamp-body in drawn position, substantially as described.

In testimony whereof I have subscribed my name hereto in the presence of two subscribing witnesses.

THOMAS J. CORCORAN.

Witnesses:
CORDELIA O'HEARN,
A. F. HERBSLEB.